J. H. LIGHTNER.
Broom Head.

No. 56,067.

Patented July 3, 1866.

Witnesses
Jas A Service
B W B Lovington

Inventor
Jno H Lightner
Per Munn & Co
Attorneys

UNITED STATES PATENT OFFICE.

JOHN H. LIGHTNER, OF SHIRLEYSBURG, PENNSYLVANIA.

IMPROVED BROOM-HEAD.

Specification forming part of Letters Patent No. 56,067, dated July 3, 1866.

*To all whom it may concern:*

Be it known that I, JOHN H. LIGHTNER, of Shirleysburg, in the county of Huntingdon and State of Pennsylvania, have invented a new and useful Improvement in Broom-Heads; and I do hereby declare that the following is a full, clear, and exact description thereof, which will enable others skilled in the art to make and use the same, reference being had to the accompanying drawings, forming part of this specification, in which—

Figure 1:
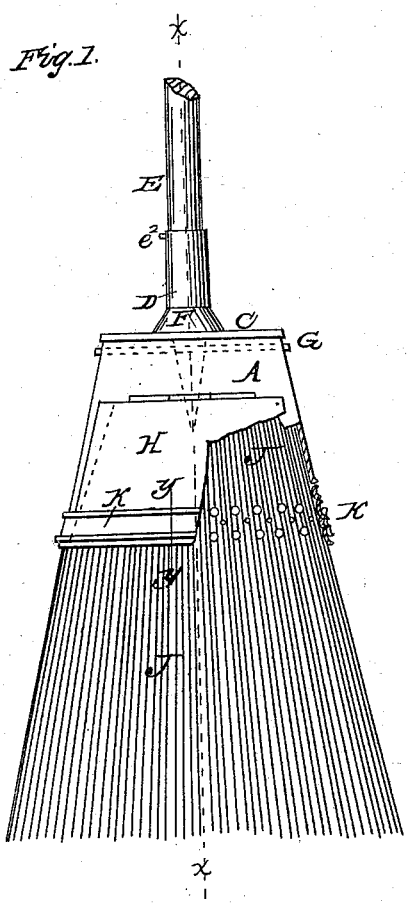
Figure 2:
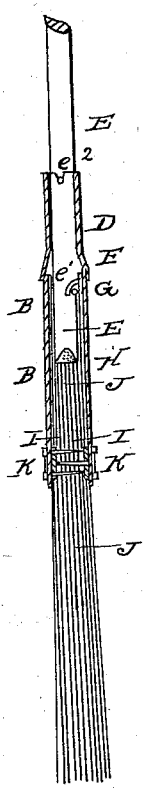
Figure 3:
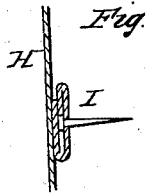

Figure 1 is a side view of my improved broom-head, a part of the cap being broken away to show the construction. Fig. 2 is a longitudinal section of the same, taken through the line $x\ x$, Fig. 1. Fig. 3 is a detail sectional view taken through the line $y\ y$, Fig. 1.

Similar letters of reference indicate like parts.

My invention has for its object to furnish a light and durable broom-head, which may be easily filled and which will hold the corn securely while being used; and it consists, first, in the toothed bars, constructed as described, in combination with the cap of the broom-head; second, in the combination of the band with the cap of the broom-head, the said band being kept in place by projections formed upon the edges of the cap and fitting into cavities formed in the under side of the ends of the said band; third, in hinging the door or flap of the broom-head to the solid part of the side of the cap; fourth, in securing the handle to the cap by a wire passing through a notch formed in the side of the handle, the whole being constructed and arranged as hereinafter more fully described.

The sides A and B of the cap and the top C are made of tin or other suitable sheet metal cut out and bent into proper shape, and connected together at the edges of the broom-head and around the edge of the top by seams.

The tube D, in which the handle E is placed, is soldered to the central part of the top C of the broom-head, around a hole formed in said top C for the reception of the handle E, and the connection is further strengthened by a cone-shaped band, F, passed around the tube E and securely soldered both to the tube and to the top C of the cap.

The lower end of the handle E is made wedge-shaped, as shown in dotted lines in Fig. 1, and it has a notch, $e'$, formed in its side, as shown in Fig. 2, in which is placed a wire, G, to prevent the handle E from being drawn from the broom-head.

The handle E may be guided into the right position for the reception of the wire G by a small pin, $e^2$, attached to the handle, which, when the handle is in the right position, enters a notch formed in the upper edge of the tube D, as shown in Fig. 2.

The lower part of the side A is cut away, as shown in Fig. 1, and to the upper edge of this cut or notch is hinged the upper edge of the door or flap H, which shuts down over and closes the space left uncovered by cutting away the said part of the side A.

I are toothed bars firmly soldered to the sides of the cap, as shown. These bars I are made of light sheet metal, perforated at regular distances. In the holes thus formed are placed ordinary tacks, and the edges of the strips are then bent down over the heads of the nails, firmly securing them in place. The bars thus prepared are then soldered fast to the inner sides of the side plates, B and H, as before described.

In the bar attached to the side plate B there may be placed two rows of nails, if desired, and one row in the bar attached to the door or flap H. The door or flap H is kept closed, and the corn J held in its place by the band K, which is made of such a shape as to fit around the lower part of the broom-head, as shown. To hold this band K in its place the edges of the broom-head are punched up from the inner side. The ends of the band K are also punched up from the inner side, thus forming projections on the broom-head and cavities in the band, which fit into each other and hold the said band in whatever position it may be placed.

What I claim as new, and desire to secure by Letters Patent, is—

1. The toothed bars I, constructed as described, in combination with the side plate B and door or flap H of the broom-head, substantially as described, and for the purpose set forth.

2. The combination of the band K, constructed and arranged as described, with the side plate B and door or flap K, substantially as described, and for the purpose set forth.

3. Hinging the door or flap H to the solid part of the side plate A, at the upper edge of the notch formed in said side plate, substantially as described, and for the purpose set forth.

4. Securing the handle E to the cap A B C by the wire G, passing through the notch e', formed in the side of the said handle E, substantially as described, and for the purpose set forth.

JOHN H. LIGHTNER.

Witnesses:
W. H. BREWSTER,
JOHN M. CLARK.